United States Patent
Coffin et al.

(10) Patent No.: US 8,066,472 B2
(45) Date of Patent: Nov. 29, 2011

(54) METHOD AND APPARATUS FOR FAN SHAFT BEARING LUBRICATION

(75) Inventors: James B. Coffin, Windsor, CT (US); David M. Daley, Manchester, CT (US); Brady Walker, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 1057 days.

(21) Appl. No.: 11/935,627

(22) Filed: Nov. 6, 2007

(65) Prior Publication Data

US 2009/0116951 A1 May 7, 2009

(51) Int. Cl.
*F01D 25/16* (2006.01)
*F01D 25/18* (2006.01)

(52) U.S. Cl. ............ 415/111; 415/1; 415/112; 415/175; 415/180; 416/1; 416/174; 60/204; 60/226.1; 60/39.08; 184/6.11; 184/11.1; 184/11.2; 384/475

(58) Field of Classification Search ...... 415/1, 111–113, 415/175, 180, 229–231; 416/1, 174; 60/39.08, 60/204, 226.1; 384/473, 474, 475; 184/6.11, 184/11.1, 11.2
See application file for complete search history.

(56) References Cited

U.S. PATENT DOCUMENTS

| | | | |
|---|---|---|---|
| 2,991,005 A * | 7/1961 | Hall | 415/175 |
| 3,915,521 A | 10/1975 | Young | |
| 4,384,749 A | 5/1983 | Schaefer | |
| 4,451,200 A * | 5/1984 | Libertini et al. | 415/111 |
| 4,598,600 A | 7/1986 | Knowles | |
| 4,858,427 A * | 8/1989 | Provenzano | 60/39.08 |
| 4,926,970 A | 5/1990 | Kimberlin | |
| 5,121,599 A | 6/1992 | Snyder | |
| 6,331,078 B1 | 12/2001 | Van Duyn | |
| 6,409,464 B1 | 6/2002 | Fisher | |
| 7,065,954 B2 * | 6/2006 | Labala | 415/112 |
| 7,174,997 B2 | 2/2007 | Sheridan | |
| 7,194,866 B1 | 3/2007 | Jones | |
| 7,225,626 B2 | 6/2007 | Robinson | |
| 2005/0199445 A1 | 9/2005 | Zalewski | |
| 2005/0217272 A1 | 10/2005 | Sheridan | |
| 2007/0137217 A1 | 6/2007 | Alexander | |

FOREIGN PATENT DOCUMENTS

EP 0458499 11/1991

OTHER PUBLICATIONS

Extended European Search Report Mar. 5, 2009.

* cited by examiner

*Primary Examiner* — Christopher Verdier
(74) *Attorney, Agent, or Firm* — Carlson, Gaskey & Olds, PC

(57) ABSTRACT

A lubrication system for a bearing assembly includes a fan shaft with a plurality of conduits, a first bearing rotatably supporting the fan shaft, and a second bearing rotatably supporting the fan shaft where the second bearing is axially spaced from the first bearing. The plurality of conduits includes at least a first conduit aligned with the first bearing and a second conduit aligned with the second bearing. A spray bar includes a plurality of supply orifices that direct lubricating fluid to the first and second bearings via at least the first and second conduits.

20 Claims, 2 Drawing Sheets

METHOD AND APPARATUS FOR FAN SHAFT BEARING LUBRICATION

BACKGROUND OF THE INVENTION

This disclosure relates to a lubrication method and apparatus for lubricating fan shaft bearings in a gas turbine engine.

A gas turbine engine includes a fan section with a fan shaft that is mounted on bearings to rotate fan blades. The fan shaft is rotatable about an axis and the bearings include a fore bearing and an aft bearing that is spaced rearwardly from the fore bearing along the axis. A seal plate is fixed to the fan shaft and is positioned forwardly of the fore bearing. A bearing spacer is fixed to the fan shaft and is positioned between inner races of the fore and aft bearings. Inner surfaces of the bearing races and the bearing spacer, and an outer surface of the fan shaft, include axial slots that are formed to extend in a direction along the axis.

A spray bar is positioned within the fan shaft and includes a pair of supply jets. A supply dam is formed on the fan shaft and is positioned between the pair of supply jets. The fan shaft also includes holes that provide fluid to the spacer and to the aft bearing. The holes are staggered with the slots in the fan shaft and bearing spacer to distribute lubricating fluid to the fore bearing and the seal plate.

The supply dam and supply jets cooperate to direct fluid toward an inner surface of the fan shaft and the supply holes; however it is difficult to control apportionment of the lubricating fluid. Further, apportionment can change with different engine operation points, which is not desirable. Thus, some holes may not receive enough lubrication fluid while other holes may receive too much.

Also, the amount of lubricating fluid supplied is determined by the number of slots and the number and size of the holes. When the amount of lubrication needs to be varied, the fan shaft and bearing spacer have to be reconfigured to adjust the number of slots and holes, and/or the size of the holes. Further, it is difficult and time consuming to properly clock the slots relative to the holes during assembly of the bearing spacer onto the fan shaft.

Accordingly, there is a need to provide an improved lubrication system that can precisely lubricate the bearings and seal plate, as well as addressing the other short comings discussed above.

SUMMARY OF THE INVENTION

An example lubrication system for a bearing assembly includes a fan shaft with a plurality of holes, a first bearing rotatably supporting the fan shaft, and a second bearing rotatably supporting the fan shaft where the second bearing is axially spaced from the first bearing. The plurality of holes includes at least a first hole aligned with the first bearing and a second hole aligned with the second bearing. A spray bar includes a plurality of supply orifices that direct lubricating fluid to the first and second bearings via at least the first and second holes.

In one example, the fan shaft is rotatable about an axis and includes an external circumferential surface and a central bore defined by an internal circumferential surface. The spray bar is located within the central bore. The spray bar includes one supply orifice for each of the plurality of holes in the fan shaft.

In one example, the fan shaft includes a plurality of dams that extend from the inner circumferential surface toward the axis. Each hole in the fan shaft is positioned between a pair of dams from the plurality of dams. Each hole is associated with a supply orifice, and each supply orifice is positioned between the pair of dams for the respective hole. Lubricating fluid is sprayed from the orifice and is directed to the respective hole by the respective pair of dams. Each hole is located to lubricate a specific area of the first and second bearings.

In one example, a seal plate is fixed for rotation with the fan shaft. In addition to first and second holes for the first and second bearings, the fan shaft also includes at least a third hole that is aligned with the seal plate. The spray bar also includes a supply orifice that is associated with the third hole.

In another example, the plurality of holes includes holes that are aligned to lubricate fore and aft sides of each of the first and second bearings. Dams are positioned on either side of each of the holes.

One method for lubricating a bearing assembly for a fan in a gas turbine engine comprises the steps of: (a) providing a fan shaft that is rotatable about an axis with a plurality of conduits; (b) rotatably supporting the fan shaft with a first bearing; (c) rotatably supporting the fan shaft with a second bearing by axially spacing the second bearing from the first bearing along the axis; (d) aligning at least a first conduit from the plurality of conduits with the first bearing and aligning a second conduit from the plurality of conduits with the second bearing; and (e) spraying lubricating fluid from a plurality of supply orifices in a spray bar to direct lubricating fluid to the first and second bearings via at least the first and second conduits.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
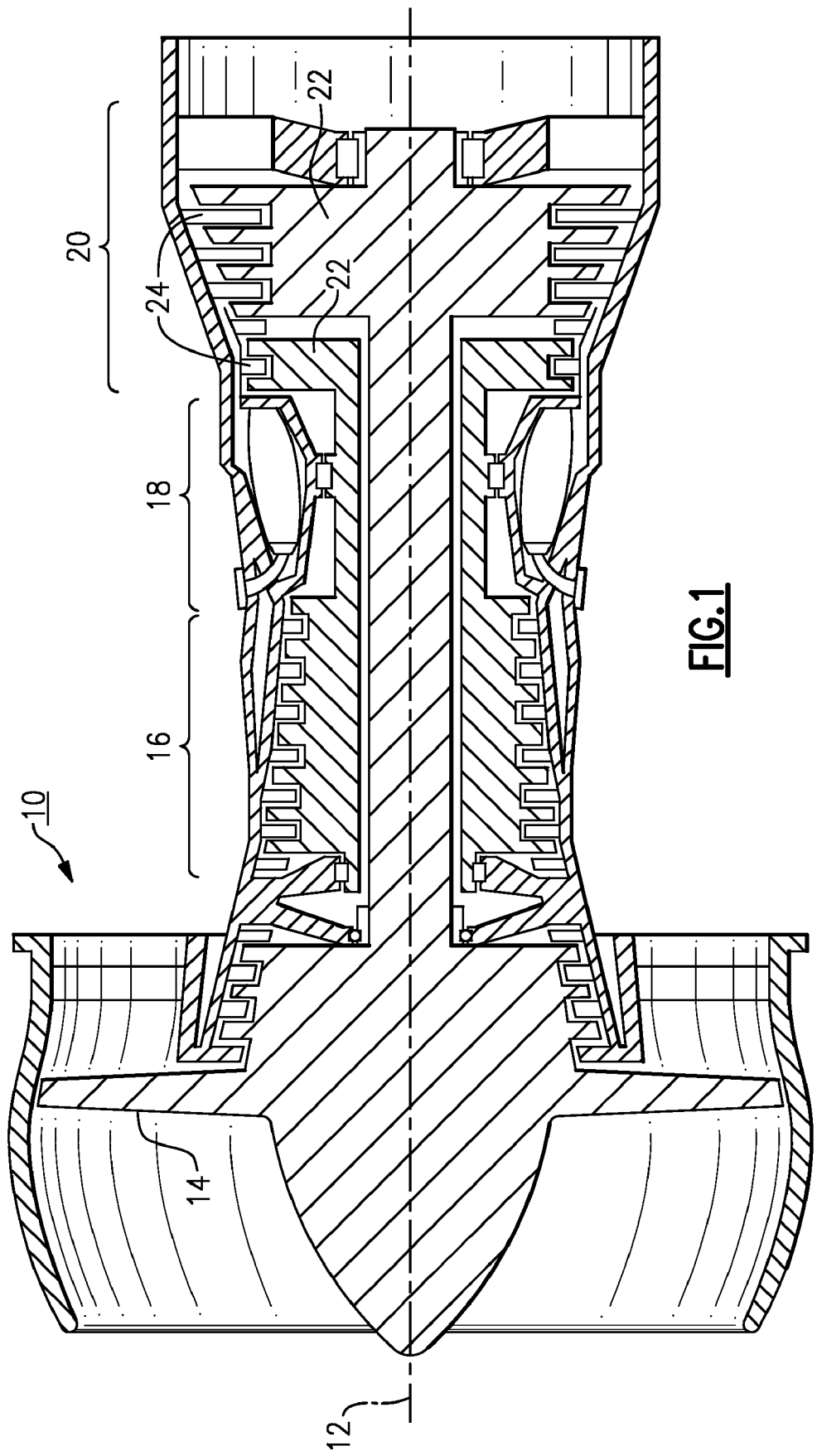
FIG. 1 is a highly schematic view of a cross-section of a gas turbine engine.

FIG. 1 illustrates selected portions of an example gas turbine engine 10, such as a turbofan gas turbine engine used for propulsion. In this example, the turbine engine 10 is circumferentially disposed about an engine centerline 12. The turbine engine 10 includes a fan 14, a compressor section 16, a combustion section 18, and a turbine section 20. The compressor section 16 and the turbine section 20 include corresponding blades 22 and vanes 24. As is known, air compressed in the compressor section 16 is mixed with fuel and burned in the combustion section 18 to produce hot gasses that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown. For example, a gas turbine engine may contain a gearbox disposed between the turbine and the fan, allowing the fan to turn at a different speed than the turbine.

Figure 2:
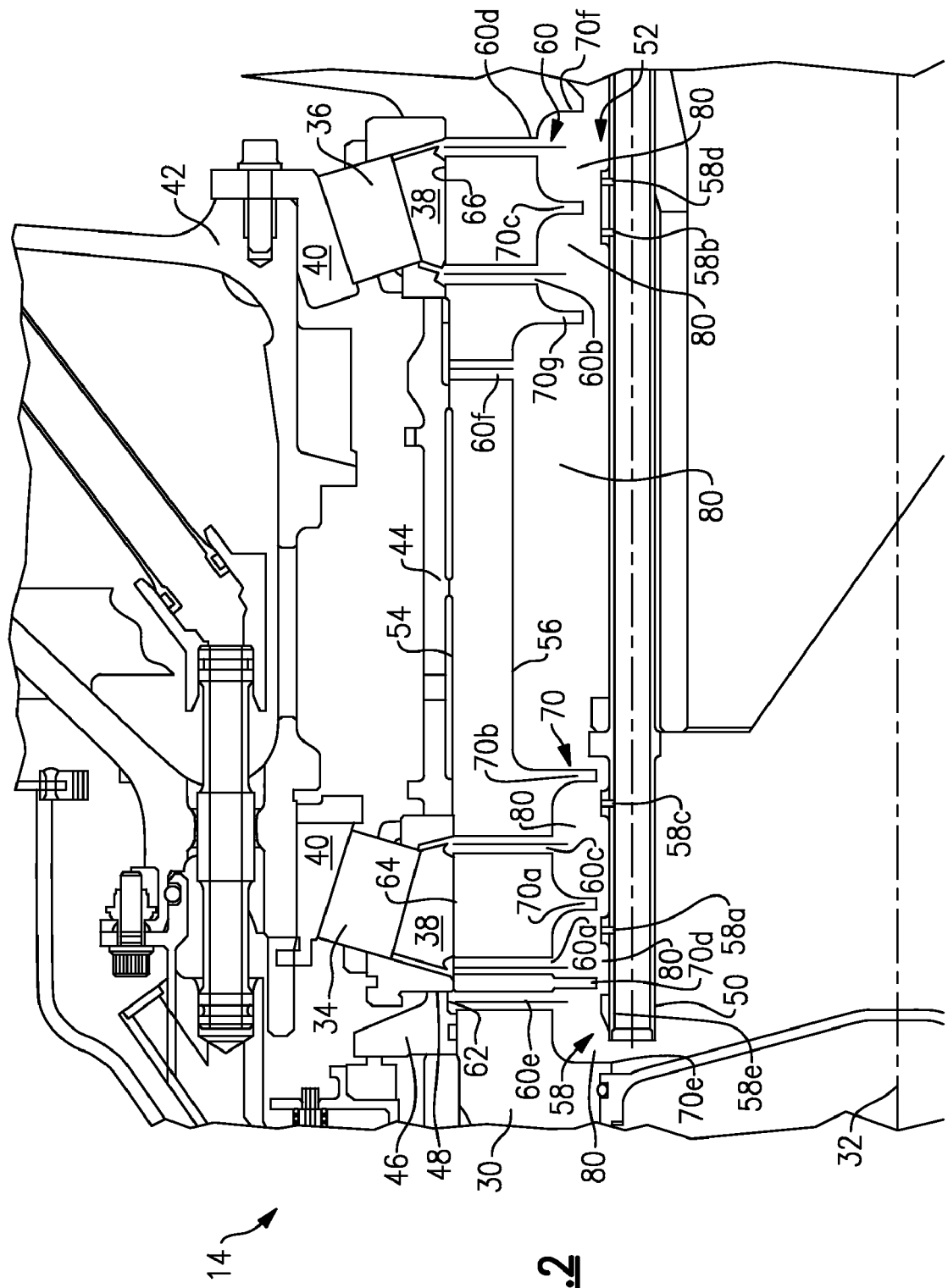
FIG. 2 is a schematic view of a partial cross-section of a fan shaft, bearing assembly, and lubrication system of the gas turbine engine of FIG. 1.

FIG. 2 illustrates an example of a section of the fan 14 drive system, which includes a fan shaft 30 that is rotatable about an axis 32 that coincides with the central axis 12 of the engine. It should be understood that only the upper cross-section of the fan shaft 30 relative to the axis 32 is shown in FIG. 2, with the lower cross-section being similarly configured to that of the upper cross-section as the fan shaft 30 comprises a component that extends about the axis 32.

The fan shaft 30 is rotatably supported by a fore bearing 34 and an aft bearing 36. The bearings 34, 36 may be ball, roller or taper style bearings. The fore 34 and aft 36 bearings are axially spaced apart from each other along the axis 32. Inner races 38 of the fore 34 and aft 36 bearings are clamped on the fan shaft 30 and outer races 40 are mounted to a bearing support 42 with the aft outer race being bolted to the support 42. The bearing support 42 is bolted to a non-rotational frame of the gas turbine engine 10. The fore bearing 34 is constrained circumferentially, but can slide axially in a bore of the bearing support 42 while the outer race 40 of the aft bearing 36 is fixed to the bearing support 42, which reacts back through an engine case to a pylon. A bearing spacer 44 is also clamped to the fan shaft 30 and is positioned between the inner races 38 of the fore 34 and aft 36 bearings.

A seal plate 46 is clamped to the fan shaft 30 and is positioned forwardly of the fore bearing 34 along the axis 32. The seal plate 46 includes a surface 48 that abuts against a fore surface of the inner race 38 of the fore bearing 34.

At least one spray bar 50 is positioned within a central bore 52 formed within the fan shaft 30. The spray bar 50 is fixed to an engine frame structure and does not rotate or translate. The fan shaft 30 includes an external circumferential surface 54 and an internal circumferential surface 56 that defines the central bore 52. The spray bar 50 includes a plurality of supply orifices 58 that project radially outwardly from the spray bar 50 toward the fan shaft 30 internal surface 56.

The fan shaft 30 includes a plurality of conduits 60 that extend radially outwardly relative to the axis 32 from the inner circumferential surface 56 to the external circumferential surface 54. The conduits 60 may be directed perpendicularly from the axis 32 as illustrated in the figure, or may be directed at an angle to the axis 32 in either the axial and/or circumferential direction (not shown). The conduits 60 may be cylindrical, conical or any other shape. A first conduit 60a is aligned with a fore side of the fore bearing 34, a second conduit 60b is aligned with a fore side of the aft bearing 36, a third conduit 60c is aligned with an aft side of the fore bearing 34, and a fourth conduit 60d is aligned with an aft side of the aft bearing 36. A fifth conduit 60e is aligned with an inner circumferential surface 62 of the seal plate 46 and directs fluid to an annulus of the seal plate 46. The first 60a and third 60c conduits are aligned within an inner circumferential surface 64 of the inner race 38 of the fore bearing 34, and the second 60b and fourth 60d conduits are aligned with an inner circumferential surface 66 of the inner race 38 of the aft bearing 36. The inner circumferential surfaces 64, 66 include annuluses associated with the fore and aft sides of the bearings.

The fan shaft 30 also includes a plurality of projections or dams 70. The dams 70 extend radially inwardly toward the axis 32 from the inner circumferential surface 56. A first dam 70a is positioned between the first 60a and third 60c conduits, a second dam 70b is positioned between the second 60b and third 60c conduits, and a third dam 70c is positioned between the second 60b and fourth 60d conduits. A fourth dam 70d is positioned between the fifth 60e and the first 60a conduits.

Additional dams 70 and conduits 60 can also be provided where needed. For example, a fifth dam 70e is provided forward of the fifth conduit 60e and a sixth dam 70f is provided aft of the fourth hole 60d. In another example, a sixth conduit 60f is aligned with the bearing spacer 44 and a seventh dam 70g is provided between the sixth conduit 60f and the second conduit 60b.

The spray bar 50 includes a plurality of supply orifices 58, with at least one supply orifice 58 being associated with each of the bearing and seal plate conduits in the fan shaft 30. A first supply orifice 58a is associated with the first conduit 60a, a second supply orifice 58b is associated with the second conduit 60b, a third supply orifice 58c is associated with the third conduit 60c, a fourth supply orifice 58d is associated with the fourth conduit 60d, and a fifth supply orifice 58e is associated with the fifth conduit 60e. As earlier described with respect to the conduits 60, the orifices 58 may be directed perpendicularly from the axis 32 as illustrated in the figure, or may be directed at an angle to the axis 32 in either the axial and/or circumferential direction (not shown). The orifices may be removable from the spray bar 50 or may be integral. Also, the shape of the orifices 58 may be circular or any other shape.

The dams 70 cooperate to form supply troughs 80 to lubricate specific areas of the support system of the fan 14. Each conduit 60 in the fan shaft 30 has its own associated supply trough 80 that is defined by a pair of dams 70, with one dam 70 being located on either side of the respective conduit 60. A single, or multiple supply orifices 58 can then be associated with each trough 80 as needed.

The supply orifices 58, the conduits 60, and the dams 70 cooperate to precisely direct lubricating fluid such as oil to the seal plate 46 and the fore 34 and aft 36 bearings. The amount of fluid supplied to each location can be varied by increasing or decreasing the size of the supply orifices 58. The conduits 60 and dams 70 in the fan shaft 30 thus do not need to be modified to vary supply of fluid to the seal plate 46 and to the fore 34 and aft 36 bearings. Further, the dams 70, conduits 60, and supply orifices 58 cooperate to ensure that lubricating fluid is divided in a known ratio between fore and aft sides of each bearing, as well as to the seal plate 46, regardless of the engine operating point. In other words, even at very low operating speeds, sufficient pressure is ensured to supply lubricating fluid to the specified locations.

Also, by using a combination of dams 70 and conduits 60 to precisely direct lubricating fluid to specific locations, milled axial slots in the fan shaft, bearing spacer, and bearing inner races can be eliminated. This increases bearing ring strength and reduces torsional induced stress in the fan shaft 30. Further, by eliminating axial slots in the bearing inner races, radial height of the race can be reduced for a given load capacity, which accordingly reduces cost and weight of the engine. Assembly and dynamic balancing are also more efficient as axial slots do not have to be properly clocked to align holes in the fan shaft during assembly.

As discussed above, lubricating fluid is precisely metered from a specific orifice, to a specific trough, and then to a specific conduit that feeds a specific annulus of the components to be lubricated, i.e. the seal plate 46 and the fore 34 and aft 36 bearings. Lubricating fluid is efficiently collected in each targeted trough, which reduces misting, churning losses, and which helps to minimize thermal management system loads created by the fore 34 and aft 36 bearings.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A lubrication system for a bearing assembly comprising:
a shaft rotatable about an axis, said shaft including a plurality of conduits and a plurality of dams extending inwardly toward said axis such that a trough is formed between each pair of adjacent dams;
a first bearing rotatably supporting said shaft;
a second bearing rotatably supporting said shaft, said second bearing being axially spaced from said first bearing along said axis, and wherein said plurality of conduits includes at least a first conduit aligned with said first bearing and a second conduit aligned with said second bearing; and
a spray bar including a plurality of supply orifices that direct lubricating fluid to said first and said second bearings via at least said first and said second conduits; and wherein said conduits and supply orifices are positioned such that the lubricating fluid exiting said plurality of supply orifices is collected within said troughs and then directed by said plurality of dams toward said plurality of conduits.

2. The lubrication system according to claim 1 including a seal plate fixed for rotation with said shaft, said seal plate positioned adjacent to one of said first and second bearings along said axis, and wherein said plurality of conduits includes a third conduit aligned with said seal plate.

3. The lubrication system according to claim 2 wherein said first conduit is positioned radially inward of an inner circumferential surface of said first bearing, said second conduit is positioned radially inward of an inner circumferential surface of said second bearing, and said third conduit is positioned radially inward of said seal plate.

4. The lubrication system according to claim 1 wherein said plurality of conduits extend radially outwardly away from said axis and said plurality of dams extend radially inwardly toward said axis, and wherein each of said plurality of conduits is positioned between two adjacent dams of said plurality of dams.

5. The lubrication system according to claim 1 wherein said plurality of supply orifices comprise at least one supply orifice for each of said plurality of conduits.

6. The lubrication system according to claim 1 wherein said fan shaft includes an external circumferential surface and a central bore defined by an inner circumferential surface with said spray bar being positioned within said central bore.

7. The lubrication system according to claim 1 wherein said first conduit is aligned with a fore side of said first bearing and said second conduit is aligned with a fore side of said second bearing, and wherein said plurality of conduits includes a third conduit aligned with an aft side of said first bearing and a fourth conduit aligned with an aft side of said second bearing, and wherein said plurality of supply orifices includes a first supply orifice to direct fluid toward said first conduit, a second supply orifice to direct fluid toward said second conduit, a third supply orifice to direct fluid toward said third conduit, and a fourth supply orifice to direct fluid toward said fourth conduit.

8. The lubrication system according to claim 1 wherein said first and second bearings include inner races that are supported on said shaft and outer races that are supported by a bearing support adapted to be mounted to a frame of a gas turbine engine, and including a bearing spacer supported by said shaft and positioned between said inner races of said first and second bearings.

9. The lubrication system according to claim 1 wherein the supply orifices are not aligned with the conduits.

10. A lubrication system for a bearing assembly comprising:
a shaft rotatable about an axis, said shaft including a plurality of conduits, and wherein said shaft includes an external circumferential surface and a central bore defined by an inner circumferential surface with each of said plurality of conduits extending from said inner circumferential surface to said external circumferential surface, and wherein said shaft includes a plurality of dams extending inwardly from said inner circumferential surface toward said axis;
a first bearing rotatably supporting said shaft;
a second bearing rotatably supporting said shaft, said second bearing being axially spaced from said first bearing along said axis, and wherein said plurality of conduits includes at least a first conduit aligned with said first bearing and a second conduit aligned with said second bearing;
a spray bar positioned within said central bore of said shaft and including a plurality of supply orifices that direct lubricating fluid to said first and said second bearings via at least said first and said second conduits, and wherein the lubricating fluid exiting said plurality of supply orifices is directed by said plurality of dams towards said plurality of conduits;
and wherein said first conduit is aligned with a fore side of said first bearing and said second conduit is aligned with a fore side of said second bearing, and wherein said plurality of conduits includes a third conduit aligned with an aft side of said first bearing and a fourth conduit aligned with an aft side of said second bearing, and wherein said plurality of supply orifices includes a first supply orifice to direct fluid toward said first conduit, a second supply orifice to direct fluid toward said second conduit, a third supply orifice to direct fluid toward said third conduit, and a fourth supply orifice to direct fluid toward said fourth conduit; and
a seal plate fixed for rotation with said fan shaft, said seal plate abutting against a fore surface of said first bearing, and wherein said plurality of conduits includes a fifth conduit aligned with said seal plate and said plurality of supply orifices includes a fifth supply orifice to direct fluid toward said fifth conduit.

11. The lubrication system according to claim 10 wherein said plurality of dams includes a first dam positioned axially between said first and fifth conduit, a second dam positioned axially between said first and third conduit, a third dam positioned between said second and third conduit, and a fourth dam positioned between said second and fourth conduit.

12. A gas turbine engine comprising:
a compressor;
a combustor;
a turbine section; and
a fan including:
a fan shaft rotatable about an axis and including a plurality of conduits and a plurality of dams extending inwardly toward said axis such that a trough is formed between each pair of adjacent dams,
a first bearing rotatably supporting said fan shaft,
a second bearing rotatably supporting said fan shaft where said second bearing is axially spaced from said first bearing along said axis, and a spray bar including a plurality of supply orifices, and wherein said plurality of conduits includes at least a first conduit aligned with said first bearing and a second hole aligned with said second bearing with said plurality of supply orifices directing lubricating fluid to said first and said second bearings via at least said first and said second conduits, and wherein said conduits and supply orifices are positioned such that the lubricating fluid exiting said plurality of supply orifices is collected within said troughs and then directed by said plurality of dams toward said plurality of conduits.

13. The gas turbine engine according to claim 12 wherein said fan shaft includes an external circumferential surface and a central bore defined by an inner circumferential surface with said spray bar being positioned within said central bore, and wherein each of said plurality of conduits extends from said inner circumferential surface to said external circumferential surface.

14. The gas turbine engine according to claim 12 wherein the supply orifices are not aligned with the conduits.

15. A gas turbine engine comprising:
a compressor;
a combustor;
a turbine section; and
a fan including:
a fan shaft rotatable about an axis and including a plurality of conduits, said fan shaft including an external circumferential surface and a central bore defined by an inner circumferential surface, and wherein said fan shaft includes a plurality of dams extending inwardly from said inner circumferential surface toward said axis,
a first bearing rotatably supporting said fan shaft,
a second bearing rotatably supporting said fan shaft where said second bearing is axially spaced from said first bearing along said axis, and
a spray bar positioned within said central bore of said fan shaft and including a plurality of supply orifices,
wherein each of said plurality of conduits extends from said inner circumferential surface of said fan shaft to said external circumferential surface,
wherein said plurality of conduits includes at least a first conduit aligned with said first bearing and a second conduit aligned with said second bearing with said plurality of supply orifices directing lubricating fluid to said first and said second bearings via at least said first and said second conduits,
wherein the lubricating fluid exiting said plurality of supply orifices is directed by said plurality of dams towards said plurality of conduits, and
a seal plate fixed for rotation with said fan shaft, said seal plate abutting against a fore surface of said first bearing, and wherein said first conduit is aligned with a fore side of said first bearing; and said second conduit is aligned with a fore side of said second bearing; and wherein said plurality of conduits includes a third conduit aligned with an aft side of said first bearing, a fourth conduit aligned with an aft side of said second bearing, and a fifth conduit aligned with said seal plate; and wherein said plurality of supply orifices includes a first supply orifice to direct fluid toward said first conduit, a second supply orifice to direct fluid toward said second conduit, a third supply orifice to direct fluid toward said third conduit, a fourth supply orifice to direct fluid toward said fourth conduit, and a fifth supply orifice to direct fluid toward said fifth conduit.

16. A method for lubricating a bearing assembly for a fan in a gas turbine engine comprising the steps of:
(a) providing a fan shaft that is rotatable about an axis, wherein the fan shaft includes a plurality of conduits and includes a plurality of dams extending inwardly toward the axis such that a trough is formed between each pair of adjacent dams;
(b) rotatably supporting the fan shaft with a first bearing;
(c) rotatably supporting the fan shaft with a second bearing by axially spacing the second bearing from the first bearing along the axis;
(d) aligning at least a first conduit from the plurality of conduits with the first bearing and aligning a second conduit from the plurality of conduits with the second bearing; and
(e) spraying lubricating fluid from a plurality of supply orifices in a spray bar wherein the conduits and supply orifices are positioned such that the lubricating fluid exiting the plurality of supply orifices is collected within the troughs and then directed by the plurality of dams toward the plurality of conduits which then direct the lubricating fluid to the first and second bearings.

17. The method according to claim 16 including mounting a seal plate for rotation with the fan shaft and aligning a third conduit from the plurality of conduits with the seal plate and directing lubricating fluid from the plurality of supply orifices to the first, second and third conduits.

18. The method according to claim 16 including associating at least one supply orifice from the plurality of supply orifices with each of said plurality of conduits.

19. The method according to claim 16 including forming the plurality of dams on an internal circumferential surface of the fan shaft, and positioning each conduit from the plurality of conduits between a pair of adjacent dams from the plurality of dams.

20. The method according to claim 16 wherein the supply orifices are not aligned with the conduits.

* * * * *